United States Patent [19]

Piereder

[11] Patent Number: 4,642,849

[45] Date of Patent: Feb. 17, 1987

[54] MEAT PACKAGING APPARATUS WITH BACKFLOW RESTRICTOR

[76] Inventor: Ludwig Piereder, Squire Court, R.R. #1, Waterloo, Ontario, Canada, N2J 4G8

[21] Appl. No.: 782,331

[22] Filed: Oct. 1, 1985

[51] Int. Cl.4 ............................................. A22C 11/02
[52] U.S. Cl. ........................................ 17/49; 17/35; 53/576
[58] Field of Search ................... 17/35, 39, 41, 49, 33; 53/511, 469, 576, 530

[56] References Cited

U.S. PATENT DOCUMENTS

| | | | |
|---|---|---|---|
| 2,871,508 | 2/1959 | Hill | 17/41 |
| 2,999,270 | 9/1961 | Knapp | 17/35 |
| 3,317,950 | 5/1967 | Ziolko | 17/45 |
| 3,396,426 | 8/1968 | Ziolko | 17/35 |
| 3,451,098 | 6/1969 | Myles et al. | 17/35 |
| 3,883,925 | 5/1975 | Muller | 17/35 X |
| 4,505,003 | 3/1985 | Becker et al. | 17/41 |
| 4,512,059 | 4/1985 | Beckman | 17/45 |
| 4,516,387 | 5/1985 | Kupcikevicius | 53/530 |
| 4,558,488 | 12/1985 | Martinek | 17/41 |

Primary Examiner—Willie G. Abercrombie
Attorney, Agent, or Firm—Kenneth M. Garrett

[57] ABSTRACT

A brake for exerting a tensioning force on a casing into which meat or the like is stuffed includes a movable braking element whereby the tensioning force may be released at an appropriate point in the cycle to permit air to be exhausted from the stuffing horn. Preferably the braking element comprises an inflatable elastomeric collar.

11 Claims, 5 Drawing Figures

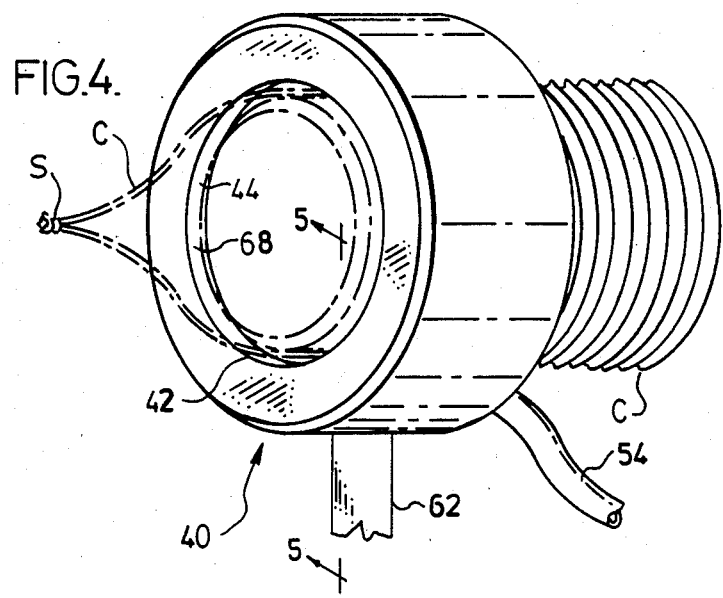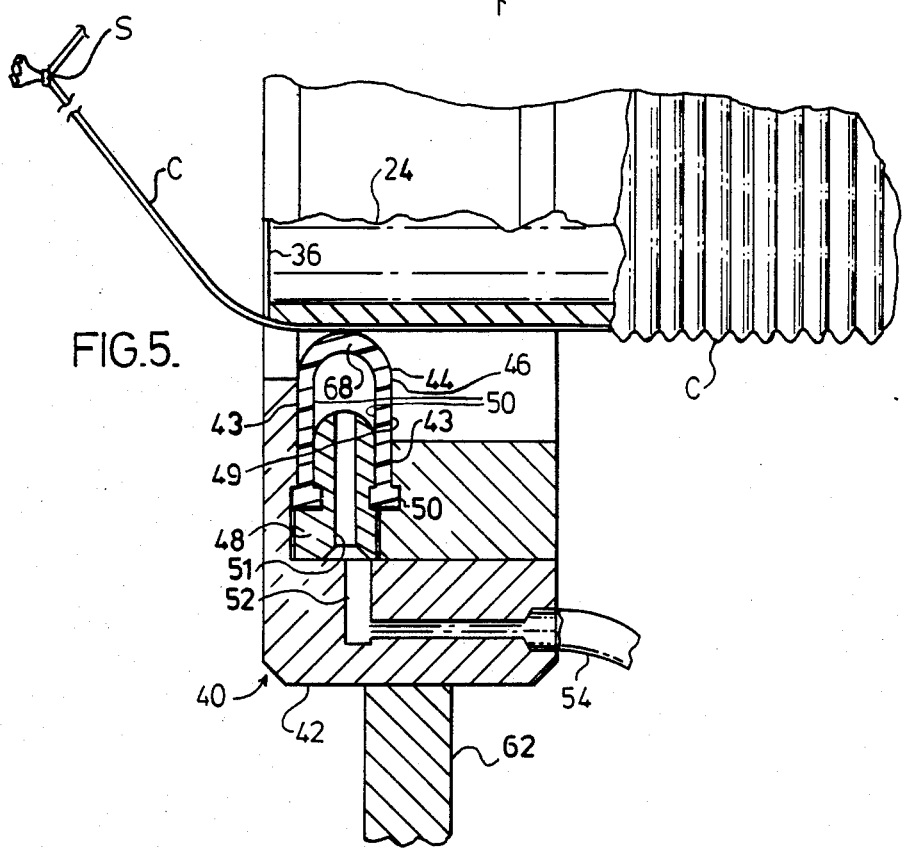

MEAT PACKAGING APPARATUS WITH BACKFLOW RESTRICTOR

FIELD OF INVENTION

This invention relates to food machinery. It particularly relates to improvements to food machinery for stuffing meat or the like into casings, although it is not necessarily limited thereto.

BACKGROUND OF THE INVENTION

Food machinery for stuffing meat such as ham into a protective casing therefor to form a number of individual packages comprises a horn on which a considerable quantity of shirred casing is stored. The forward end of the casing is sealed, a quantity of meat is extruded through the horn into the casing, and the after end of the casing is sealed to complete a cycle. Generally it is required to extrude measured quantities of meat into a casing, and high speed machines such as described in my pending U.S. patent applications Ser. Nos. 539,575 or 757,999 titled MEAT PACKAGING APPARATUS employ a pneumatically operated ram to expel meat from the horn as part of the cyclic operation. At the beginning of each cycle using machines of this type, the horn is empty. Meat forced through the horn in the first step of a cycle for extrusion into the casing displaces the air from the horn. Where the casing is of a porous nature, this air may escape through the casing wall itself. Increasingly, advantage is being found in using barrier type casings which are substantially impermeable. When using such impermeable casings, the expelled air in this first step of the cycle must be exhausted between the outer wall of the horn and the casing stored thereon. In that the casing is only loosely fitted on the horn for storage purposes, the exhaust of air between the casing and horn does not create a problem. However, it is normally required that the meat be stuffed into the casing under pressure, and a tensioning device is employed to restrict the free movement of the casing from the horn under the influence of the meat being extruded into the casing. The pressure induced within the casing in this manner induces a backflow of meat between the outer surface of the horn and the casing mounted thereon. A backflow restrictor is provided to prevent such backflow. The backflow restrictor may be combined with the tensioning device, or it may be separate therefrom. In all events, the backflow restrictor functions to prevent the exhaust of the expelled air from the horn.

It is then a primary object of this invention to provide improved apparatus for stuffing casings.

It is another object of the invention to provide such apparatus which may have increased throughput.

It is yet another object of the invention to provide apparatus for use in connection with impermeable casings.

It is still another object of the invention to provide apparatus with an improved backflow restrictor.

It is a further object of the invention to provide a method which is particularly adapted for high speed stuffing of impermeable casings to provide individual packages.

SUMMARY OF THE INVENTION

In accordance with a broad aspect of the invention, there is provided apparatus for cyclically stuffing a length of casing to provide a plurality of discrete packages. The apparatus includes a horn with an inlet end and an outlet end, upon which a quantity of casing to be stuffed is mounted, and means for cyclically feeding meat through the horn in a first step during which air contained in the horn is displaced and exhausted through the outlet end, and a second step in which meat is extruded from the outlet end into the casing so as to empty the horn. A backflow restrictor is associated with the horn at the outlet end thereof, and is actuatable between an off condition wherein it permits the free escape of fluid thereby, and an on position wherein it restricts the flow of fluid. Control means is provided to actuate the backflow restrictor to its off position for the duration of the first step of the cycle, so as to permit the free exhaust of air from the horn during this step, and to actuate the backflow restrictor to an on condition for the duration of the second step of the cycle, thereby preventing the backflow of meat during the time when the casing is being filled.

Suitably the backflow restrictor includes a constrictive element for constricting about a complete circular path about the outer surface of the horn, whereby it will serve to trap the casing between the horn and the constrictive element when actuated to the on position. When actuated to the off position, the backflow restrictor will then permit the free flow of air between the outer surface of the horn and the casing stored thereon. It will also be appreciated that when the backflow preventer is actuated to the off position, the casing may be more readily be withdrawn from the horn, particularly where the backflow restrictor serves a dual purpose as a casing tensioner.

Preferably the constrictive element is a hollow elastomeric element having a fluid supply to the interior thereof, whereby it is actuated to the off position by decreasing the internal pressure and as a corollary, to the on position by increasing the internal pressure.

These objects and aspects of the invention, and still other aspects and advantage thereof will become more apparent from a consideration of a preferred embodiment thereof, taken in conjunction with the accompanying drawings.

BRIEF DESCRIPTION OF THE DRAWINGS

FIG. 4 shows in greater detail the front of the horn with the backflow restrictor positioned thereon, and FIG. 5 is a section on 5—5 of FIG. 4 and shows additionally control elements for the backflow restrictor.

DESCRIPTION OF THE PREFERRED EMBODIMENT

Figure 1:
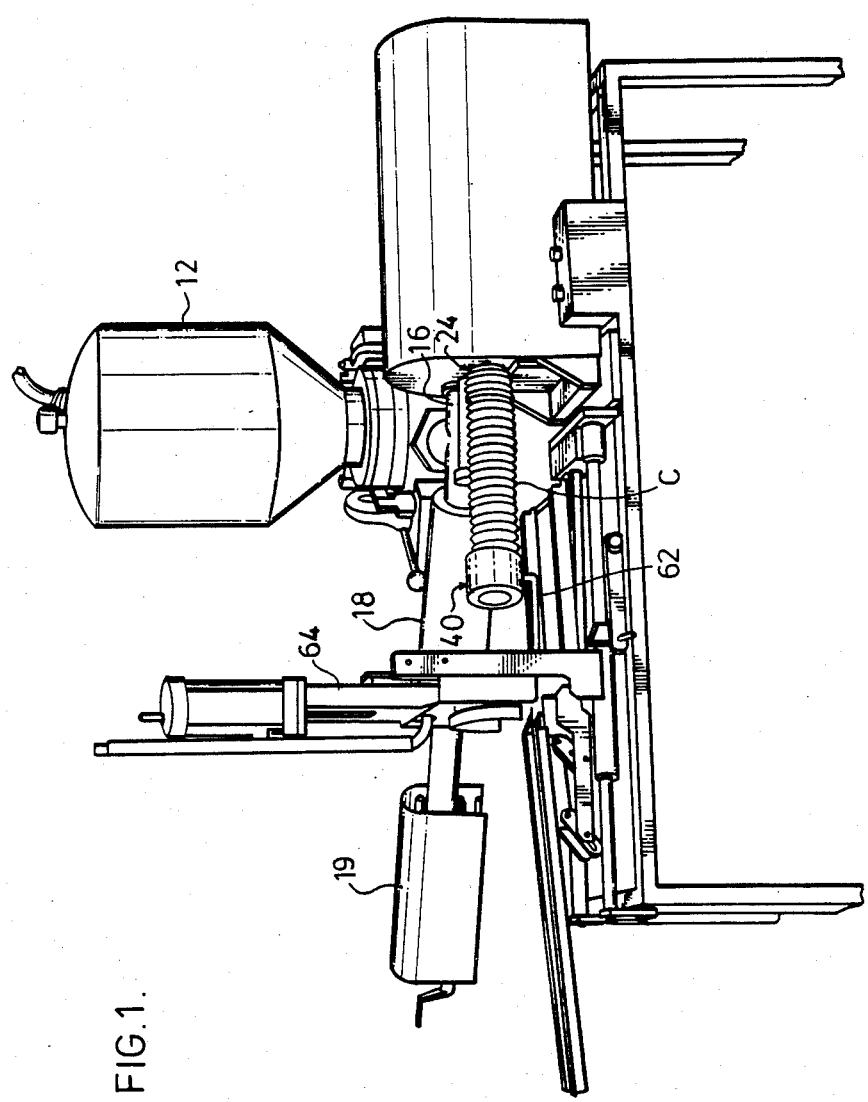
FIG. 1 shows in perspective view a meat packaging apparatus of known type with the backflow restrictor of the invention combined therewith.

The meat packaging apparatus of FIG. 1 comprises a meat reservoir 12 which typically may contain mollified whole muscle meat such as ham. Reservoir 12 connects via gate valve 14 and supply tube 16 to meat portioner 18 driven by a pneumatic motor 19, a portioner of this nature being described more fully in my U.S. Pat. No. 4,188,767.

Figure 2:
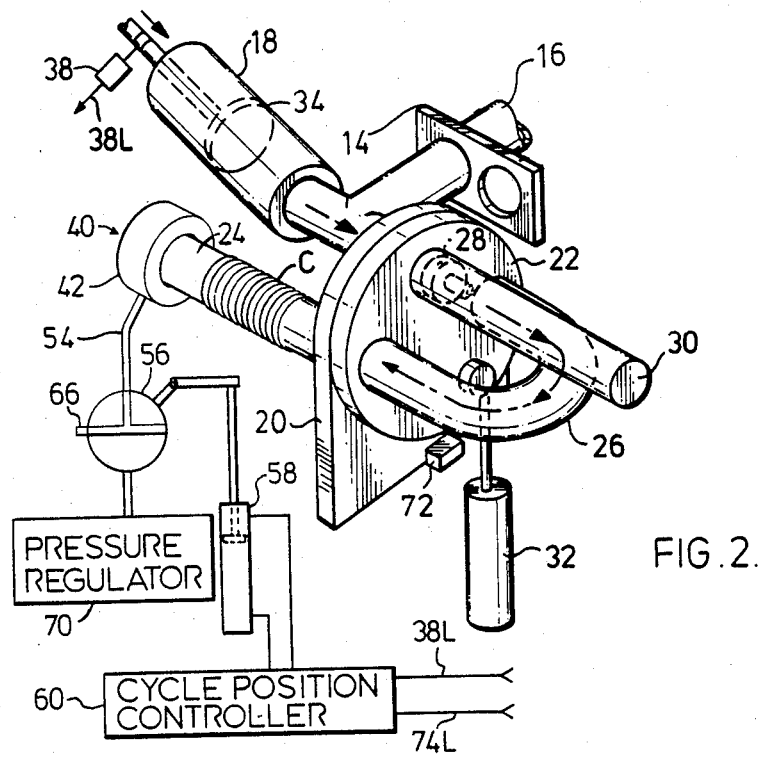
FIG. 2 and 3 show a portion of the apparatus of FIG. 1 schematically and on larger scale and at different positions in an operational cycle.
Figure 3:
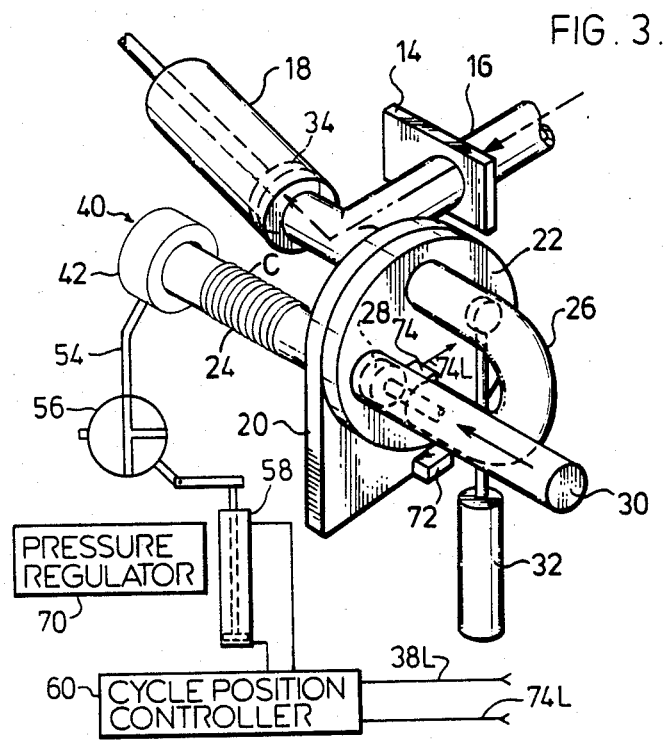

Portioner 18 mounts from a fixed plate 20 on the forward side thereof. A second plate 22 is mounted in facing relationship with plate 20 to be rotatable with respect thereto. A stuffing horn 24 also mounts from fixed plate 20 in spaced apart relationship to portioner 18. A U shaped conduit 26 mounts from the rotatable plate 22, together with a ram 28 driven by a pneumatic motor 30. A second pneumatic motor 32 drives plate 22 on a reciprocating path between two stations. At the first station, as seen in FIG. 2, conduit 26 interconnects meat portioner 18 with horn 24. At the second station, as seen in FIG. 3, ram 28 is aligned with horn 24, and plate 22 seals the outlet of portioner 18.

Assuming the components to be positioned at the second station, gate valve 14 is opened and a ram 34 forming part of portioner 18 is driven rearwardly by portioner motor 19 a predetermined amount relating to the volume of meat desired to be packaged, and meat is pumped into the portioner from reservoir 12. Plate positioning motor 32 then drives plate 22 to the first station. Assuming a steady state operating condition, conduit 26 will be fully charged with meat. At the second station ram 34 of portioner 18 is driven by portioner motor 19 to expell meat from the portioner in a first step of the cycle, thereby forcing meat from conduit 26 into horn 24, which is empty at the commencement of this first step. The passage of meat along horn 24 displaces the air contained within the horn forwardly through the outlet end 36 of the horn. When the volume of meat expelled from portioner 18 is equal to the volume of the horn 24, air will be completely displaced from the horn. At this point a signal marking the end of the first step, and correspondingly the beginning of the second step is generated by sensor 38 associated with proportioner 18.

A length of shirred casing C is stored on horn 24. Adjacent the outlet end 36 of horn 24 there is located a backflow restrictor 40. Backflow restrictor 40 comprises a rigid, annular support frame 42, the interior surface of which is grooved at 43, in which groove there is mounted so as to project radially inwardly therefrom a hollow hose 44 to completely circumscribe horn 24 adjacent the outlet end 36 thereof. Hose 44 is a two part construction comprising an elastomeric diaphragm 46 having a U shaped axial cross section and a plug 48 therefor. The radial walls 49 of diaphragm 46 are T shaped at the distal edges thereof at 50. Plug 48 and the walls defining groove 43 have a complementary shape to the distal edges 50 to lock the diaphragm in position in the support frame. The radial walls 49 of the diaphram 46 are substantially overlaid by the walls forming groove 43, particularly at the axially forward facing side thereof. This structure limits the axial movement of diaphragm 46 under the forces to which it is exposed in operation, which arise from the inflation of hose 44, and the drag of casing C on the hose, as will be further described.

Plug 48 is provided with a radial bore 52 therethrough which communicates with an air conduit 52 formed in support frame 42. Air conduit 52 connects by way of an air tube 54 to a T valve 56 actuated between two positions by pneumatic motor 58, which is controlled by a cycle position controller 60 as will be further described. Backflow restrictor 40 is supported by an arm 62 from a stapler unit 64 which is movable with respect to horn 24, so as to provide easy access to the horn for replenishing the supply of casing thereon.

At the beginning of the first step of the cycle, T valve 56 is in the position shown in FIG. 2 wherein the interior of hose 44 connects to the ambient atmosphere at 66. In this condition, the bight portion 68 of diaphragm 46 is uniformly spaced apart by about 3 mm from horn 24. Also at the beginning of the first step of the cycle, casing C is stapled at S. As ram 34 of portioner 18 commences to urge meat from the portioner into conduit 36 and thence into horn 24, the air displaced from horn 24 exhausts freely from the horn between the outer surface of the horn and casing C. At the end of the first step, i.e. when the air/meat interface in horn 24 is substantially at the outlet opening of the horn, a signal is received from senser 38 on line 38L by cycle position controller 60, causing valve motor 58 to actuate the valve to its second position, as shown in FIG. 3. Here the interior of hose 44 connects to a pressure regulator 70 providing a source of air at predetermined super atmospheric pressure, causing elastomeric diaphragm 46 to distend and thereby constricting hose 44 uniformly about a complete circumferential path on horn 24 to nip casing C between bight 68 and horn 24. Conveniently this is referred to as turning the backflow restrictor 40 on.

Further expulsion of meat from portioner 18 then commences to fill casing C under a pressure which is controlled by pressure regulator 70, and to draw casing from the supply of casing on the horn 24. When portioner 18 is empty, a signal is sent to plate motor 32, which drives plate 33 to the second station (FIG. 3). A signal from a plate position senser 72 initiates ram motor 30 to drive ram 28 into horn 24 until meat contained within the horn is fully extruded therefrom into casing C, this condition being sensed by ram sensor 74. Sensor 74 signals cycle position controller 60 on line 74L indicating the end of the second step. Conveniently, the receipt of this signal causes valve motor 58 to return T valve 56 to its first position, thereby releasing air pressure from hose 44, so turning the backflow restrictor off and conditioning the backflow restrictor 40 for the first step of a new cycle. The old cycle is completed by withdrawing ram 28 from horn 24 and returning plate 22 to the first station, during which time casing C is stapled shut to seal the package of meat, and the leading end of an adjacent portion of casing is stapled shut for receiving the next portion of meat therein.

It will be appreciated that during the period of time that plate 22 locates at the second station, portioner 18 will be loaded with a new charge of meat from meat supply reservoir 12, as earlier described, ready for the initiation of the new cycle.

While in the foregoing embodiment the backflow restrictor also serves the purpose of tensioning the casing, it will be apparent that a separate tensioning device can be used, as is known in the art, together with other devices such as casing sizing disks or the like, should this be desired. In these instances it will be ensured that these other devices do not restrict the exhaust of air between the horn and the casing.

The foregoing embodiment is exemplary only, and is directed to a presently preferred embodiment of the invention. It is not intended to be restrictive of the invention, at least in regard to broad aspects thereof. It will be apparent that many departures therefrom may be made, and it is intended that such departures fall within the scope of the claim appended hereto.

I claim:

1. Apparatus for cyclically stuffing a length of casing to provide a plurality of discrete packages comprising:
   a horn having an inlet end and an outlet end and upon which a length of casing for stuffing is storable;
   means for cyclically feeding meat through said horn in a first step during which air contained in said horn is displaced and exhausted though said outlet end, and in a second step in which meat is entirely extruded from said horn through said outlet end;

a backflow restrictor means associated with said horn at said outlet end, said backflow restrictor means being actuatable between a first, off, condition for permitting the escape of fluid from said casing, and a second, on, condition for substantially preventing the escape of fluid from said casing, and control means for detecting said first step and responsive thereto for actuating said backflow restrictor means to an off condition for the duration of said first step, and for detecting said second step and responsive thereto for actuating said backflow restrictor means to an on condition for the duration of said second step.

2. Apparatus is defined in claim 1, wherein said backflow restrictor means includes a constrictive element for constricting about a complete circumferential path on the outer surface of said horn, whereby it may trap the casing between said horn and said constrictive element when actuated to said on condition.

3. Apparatus as defined in claim 2, wherein said constrictive element is a hollow elastomeric element having a fluid supply connector to the interior thereof, and which is actuated between said off condition and said on condition by varying the pressure of fluid in the interior thereof.

4. Apparatus as defined in claim 2, wherein said constrictive element is a hollow, two part construction comprising an elastomeric diaphragm having a U shaped axial cross section and a fixed annular plug sealing the open side diaphragm.

5. Apparatus as defined in claim 4, wherein said parts include coacting elements to prevent the separation of said parts.

6. Apparatus as defined in claim 1, wherein said backflow restrictor comprises a rigid element having an opening therethrough defined by an inwardly facing axial wall, and means for supporting said element with said axial wall in spaced apart circumscribing relationship to said horn.

7. Apparatus as defined in claim 6, wherein said backflow restrictor comprises a hollow hose mounted from said axial wall in circumscribing relation to said horn.

8. Apparatus as defined in claim 7, wherein said hose and said rigid element are provided with cooperating elements to retain said hose in position.

9. Apparatus as defined in claim 7, wherein said axial wall is provided with a groove and wherein said hose is provided with a cooperating shoulder which is trapped in said groove to restrict the movement of said hose.

10. In an apparatus for stuffing a length of casing of low permeability to provide a plurality of sealed, discrete packages wherein a length of said casing is mounted on a stuffing horn and wherein said stuffing horn is completely emptied each time a package is stuffed;

the improvement wherein there is provided a backflow restrictor, and means for actuating said backflow restrictor to an off condition for the duration of the movement of an air-stuffing interface along said horn, to permit the escape of air displaced from said horn and to an on condition for the duration of the extrusion of stuffing from the horn into the casing to restrict the escape of fluid from said casing.

11. A method for stuffing a length of casing of low permeabiliy to provide a plurality of sealed, discrete packages in a cyclical operation wherein a length of said casing is mounted on a horn and wherein a backflow restrictor is employed to restrict the flow of stuffing between the casing and the outer surface of the horn, comprising closing the leading end of said casing;

conditioning said backflow restrictor to an off condition;

forcing stuffing into the inlet end of the horn to displace air therefrom;

detecting the point at which air is substantially displaced from said horn and responsive thereto conditioning said backflow restrictor to the on condition;

continuing to extrude stuffing from said horn into said casing until the stuffing is substantially extruded from the horn, and detecting the said complete extrusion and responsive thereto sealing the stuffed casing and initiating a new cycle.

* * * * *